(No Model.) 7 Sheets—Sheet 1.
G. E. CHURCH & G. W. ETTENGER.
MEANS FOR BINDING TOGETHER METAL TUBES SERVING FOR GIRDERS, PILLARS, &c.
No. 542,145. Patented July 2, 1895.
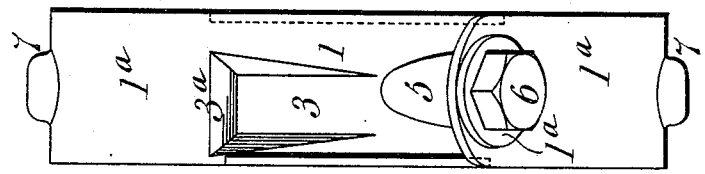
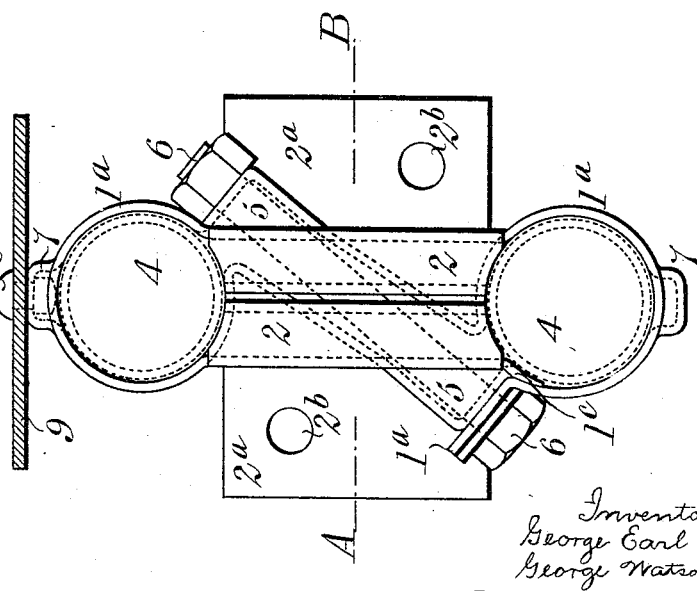
Witnesses:
Geo. W. Rea.
Thos. A. Green
Inventors;
George Earl Church and
George Watson Ettenger
By James L. Norris.
Atty (No Model.) 7 Sheets—Sheet 2.
G. E. CHURCH & G. W. ETTENGER.
MEANS FOR BINDING TOGETHER METAL TUBES SERVING FOR GIRDERS, PILLARS, &c.
No. 542,145. Patented July 2, 1895.
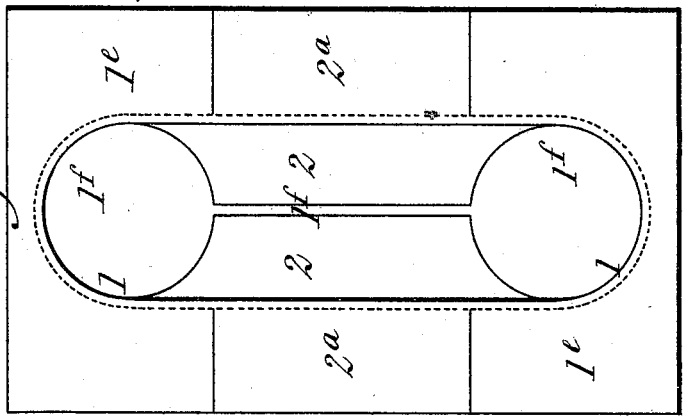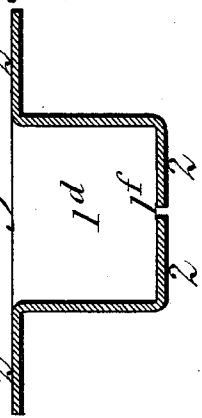
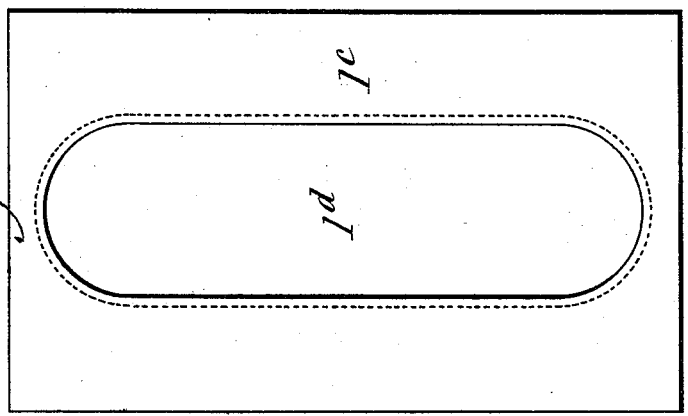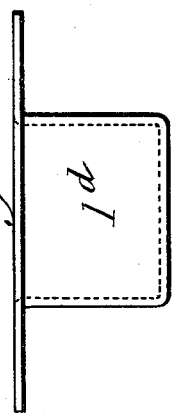
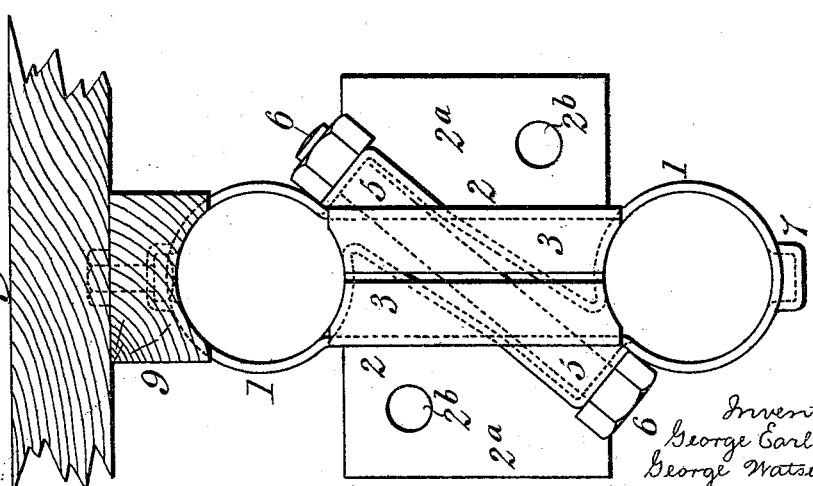
Witnesses:
Geo. W. Rea.
Thos. A. Green
Inventors:
George Earl Church and
George Watson Ettenger,
By James L. Norris.
Atty.

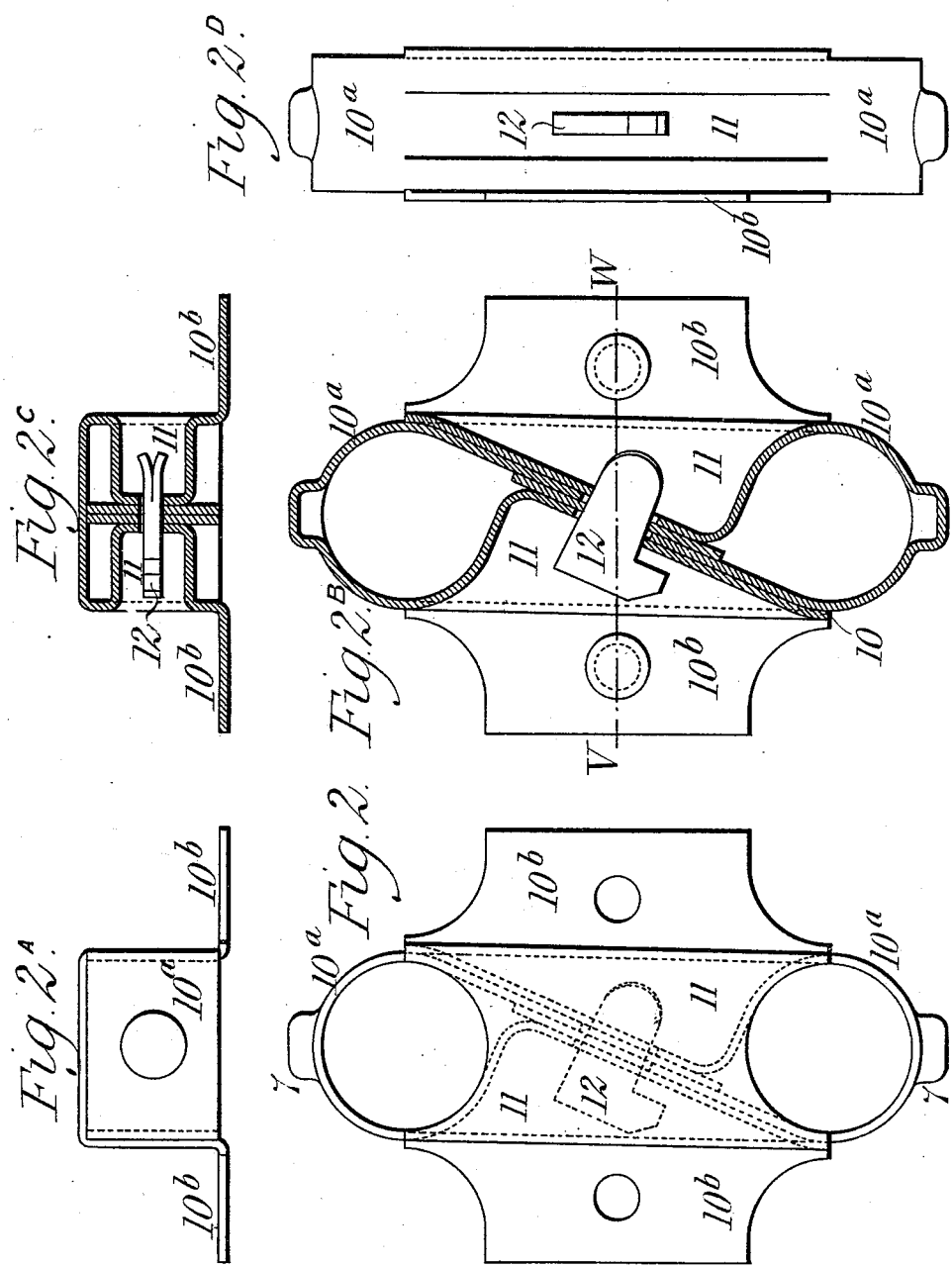

(No Model.) 7 Sheets—Sheet 4.
G. E. CHURCH & G. W. ETTENGER.
MEANS FOR BINDING TOGETHER METAL TUBES SERVING FOR GIRDERS, PILLARS, &c.
No. 542,145. Patented July 2, 1895.
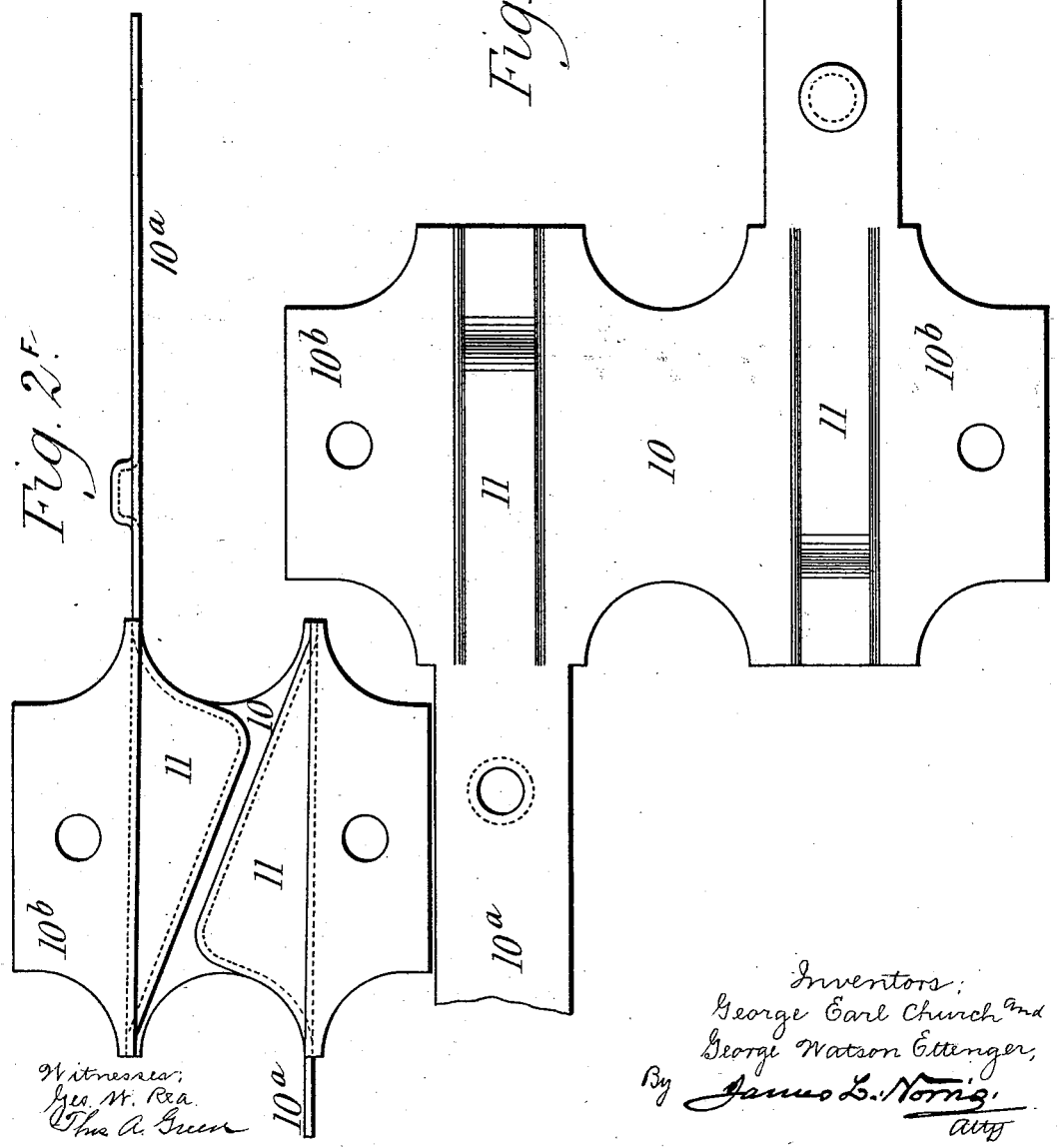

(No Model.) 7 Sheets—Sheet 5.
G. E. CHURCH & G. W. ETTENGER.
MEANS FOR BINDING TOGETHER METAL TUBES SERVING FOR GIRDERS, PILLARS, &c.
No. 542,145. Patented July 2, 1895.
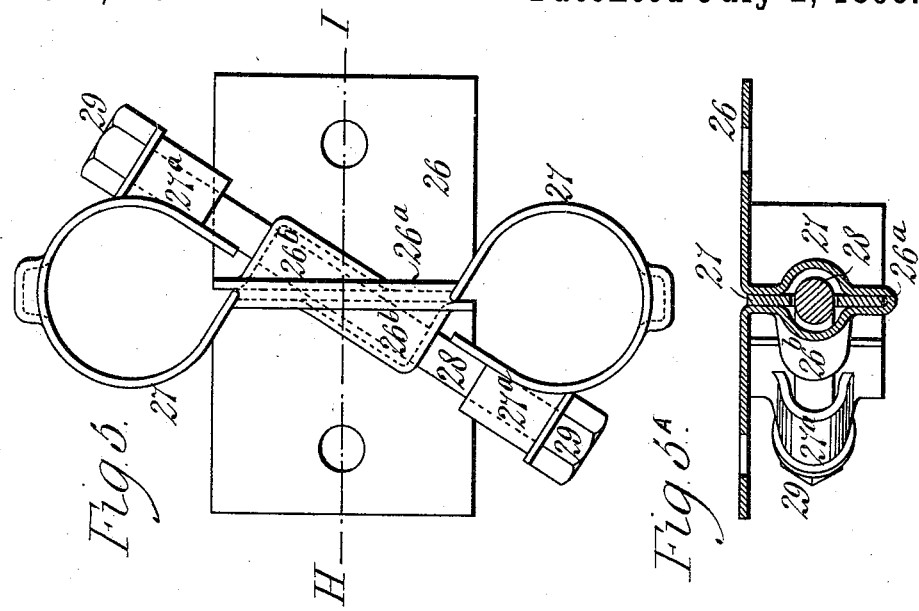
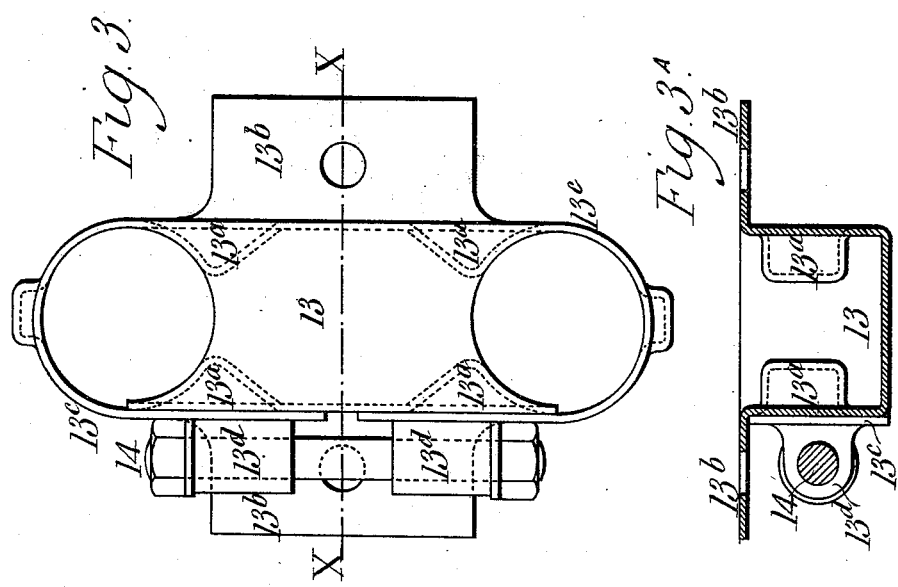
Witnesses:
Geo. W. Rea.
Thos. A. Green
Inventors:
George Earl Church and
George Watson Ettenger,
By James L. Norris.
Atty.

(No Model.) 7 Sheets—Sheet 6.
G. E. CHURCH & G. W. ETTENGER.
MEANS FOR BINDING TOGETHER METAL TUBES SERVING FOR GIRDERS, PILLARS, &c.
No. 542,145. Patented July 2, 1895.
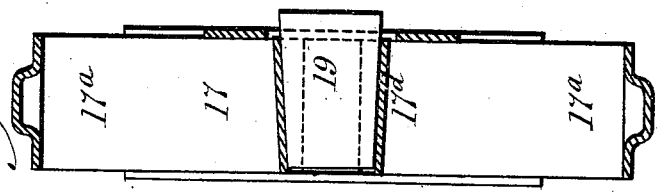
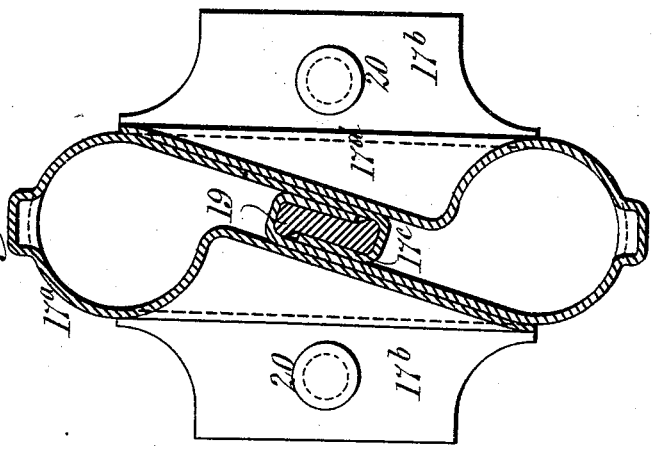
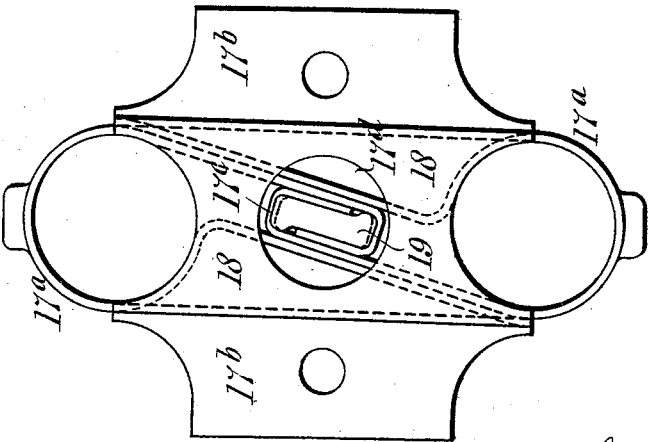
Witnesses:
Geo. W. Rea.
Thos. A. Green
Inventors:
George Earl Church and
George Watson Ettenger,
By James L. Norris.
Atty.

(No Model.) 7 Sheets—Sheet 7.
G. E. CHURCH & G. W. ETTENGER.
MEANS FOR BINDING TOGETHER METAL TUBES SERVING FOR GIRDERS, PILLARS, &c.
No. 542,145. Patented July 2, 1895.
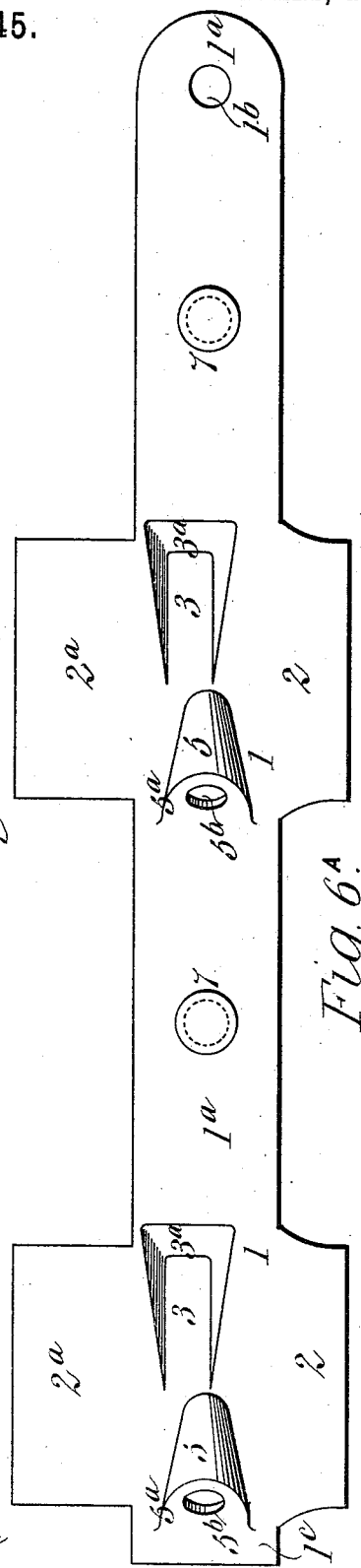
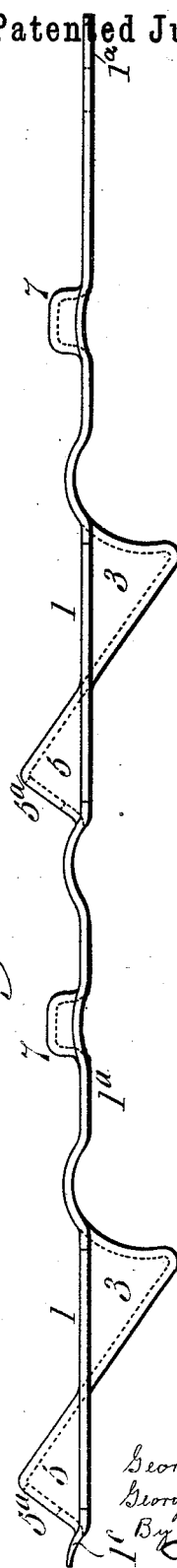

UNITED STATES PATENT OFFICE.

GEORGE EARL CHURCH AND GEORGE WATSON ETTENGER, OF LONDON, ENGLAND.

MEANS FOR BINDING TOGETHER METAL TUBES SERVING FOR GIRDERS, PILLARS, &c.

SPECIFICATION forming part of Letters Patent No. 542,145, dated July 2, 1895.

Application filed April 10, 1895. Serial No. 545,192. (No model.)

*To all whom it may concern:*

Be it known that we, GEORGE EARL CHURCH, civil engineer, and GEORGE WATSON ETTENGER, mechanical engineer, citizens of the United States, residing at Dashwood House, 9 New Broad Street, in the city of London, England, have invented certain new and useful Improvements in the Means for Binding Together Metal Tubes Serving for Girders, Pillars and the Like, of which the following is a specification.

This invention relates to a new construction of metal binders made of rolled or drawn metal sheets or plates and that serve to embrace two tubes acting either as girders, pillars, and the like, so as to secure them firmly together at a greater or less distance apart.

The essential feature of the invention consists in forming the middle part of such binders, which, when in position, is situated between the tubes to be secured, with pockets or recessed parts by means of pressure in suitable molds or dies which serve to stiffen that part of the binder so as effectually to withstand the forcing together of the tubes by transverse strains or the pressure of a load, while the ends of the binder are made to serve as pliable straps that encircle the tubes in drawing them tightly against shoulders or abutments formed by the said pockets or recessed parts. Such binders, while retaining in all cases the above-stated essential features may be greatly modified both as to mode of manufacture and detail of construction, as I will proceed to explain with reference to the accompanying drawings, in which—

Figures 1, $1^A$, and $1^B$ show, respectively, a front view, a side view, and a section at A B, Fig. 1, of one construction, while Figs. 6 and $6^A$ show, respectively, a plan and edge view of the prepared plate for the binder before being bent into the required shape for embracing the tubes. Fig. $1^C$ shows an elevation of the same construction of binder produced in another manner, and Figs. $6^B$ and $6^C$ show, respectively, a plan and end view of the first stage of the blank for producing it, while Figs. $6^D$ and $6^E$ show a plan and cross-section of the second stage of the blank. Fig. 2 shows a front view of another mode of construction. Fig. $2^A$ shows an end elevation; Fig. $2^B$, a vertical section; Fig. $2^C$, a cross-section on line V W on Fig. $2^B$; and Fig. $2^D$, a side view, while Fig. $2^E$ shows a plan of the blank with the pockets formed thereon, and Fig. $2^F$ a side view of the same partly bent into shape. Fig. 3 shows an elevation of another modification, and Fig. $3^A$ a cross-section at X X on Fig. 3. Fig. 4 shows a front view of a modification of the binder at Fig. 2; Fig. $4^A$, a longitudinal section, and Fig. $4^B$ a transverse section; and Figs. 5 and $5^A$ show respectively a front view and section on line H I on Fig. 5 of another modification.

Referring to the construction at Figs. 1 to $1^B$ and 6 $6^A$, the rolled plate, Fig. 6, formed by shearing or stamping, has first portions 1 1 with wings 2 2 and $2^a$ $2^a$, the parts 1 1 being embossed by stamping in dies or otherwise, so as to produce thereon, first, two pockets or hollow projections 3 3, having faces $3^a$ $3^a$ formed as circular arcs, adapted to fit the surfaces of the tubes 4 4, indicated in dotted lines at Fig. 1, which are to be secured together, and, secondly, there are formed thereon two other pockets or hollow projections 5 5 on the opposite side to that on which 3 3 are formed, and which have on the faces $5^a$ $5^a$ holes $5^b$ $5^b$ for the passage through them of a screw-bolt 6, as at Fig. 1. The wings 2 2 are also bent by stamping to form the U-shaped section shown at Figs. 1 and $1^B$. Connecting the parts 1 1 are parts $1^a$ $1^a$ formed as straps, which are subsequently bent into the form shown at Fig. 1, so as to encircle the tubes to be secured, and in the one strap is formed a hole $1^b$ for the passage of the bolt 6. Lastly there may be formed on the strap 8 hollow projections 7 7, for purposes to be presently described. The plate being thus formed, it is then bent by pressure in molds into the shape shown at Fig. 1, so that its parts partially encircle the two tubes 4 4, while the pockets or projections 3 3 fit with their surfaces $3^a$ $3^a$ against the inner sides of the tubes, extending somewhat beyond the vertical center line, and the projections 5 5, lying in line with each other in an oblique direction, form the abutments for the screw-bolt 6, against the lower one of which abutments lies the bent end $1^a$ of the strap, this end being made to overlap the other end 1ᵉ which fits against the tube 4.

On referring to Fig. 1 it will be seen that on screwing up the nut of the bolt 6 not only will the strap be drawn tight around each of the tubes 4 4, but the curved projections or pockets 3 3ᵃ will also be made to abut closely against the inner parts of the tubes, while the U-shaped parts 2 2 will afford additional rigidity to the intervening part of the binder between the two tubes, withstanding the force exercised by the screw-bolt tending to draw the two tubes toward each other, and also an extraneous lateral force having such tendency.

The wings 2ᵃ are formed with holes 2ᵇ, so as to serve for lateral attachment of the binder to some other structural part when required. Lastly the hollow bosses 7 7 at each end of the binder, having a hole formed through them, may serve for the reception of a bolt or rivet 8 for attachment of a structural member 9 to the binder.

Fig. 1ᶜ shows a binder of the same finished form as at Fig. 1, but which has no open joint. This construction can be carried out either by welding the two ends of the plate together after this has been shaped as described with reference to Fig. 6, or it may be produced by pressing and shearing in molds. For this latter purpose a flat plate, Fig. 6ᴮ, has first a pocket 1ᵈ formed in it, after which it is subject to the action of punching and shearing dies, whereby the parts 1ᵉ 1ᵉ of the plate 1 and the part 1ᶠ of the bottom of the pocket are removed, so that the closed loop 1 now corresponds to the strap 1 of Fig. 1, while 2 2 correspond to the wings 2, and 2ᵃ correspond to the flanges 2ᵃ. The binder is then subject to further pressure in dies, whereby it is finally converted into the shape at Fig. 1ᶜ—that is to say, the pockets 3 3 and 5 5 are formed and the wings 2 are bent into trough shape.

Figs. 2 to 2ᶠ show a construction in which the binder is formed from a blank of the shape shown at Fig. 2ᴱ. The blank is made with a middle portion 10, two straps 10ᵃ 10ᵃ and two wings 10ᵇ 10ᵇ. In this blank are first formed pockets 11 11, and the sides of the middle part 10 are then bent round, so as to bring the straps 10ᵃ and pockets 11 11 into the relative positions shown at Fig. 2ᶠ, while the wings 10ᵇ are again bent at right angles, so as to be parallel to the middle part 10. The straps 10ᵃ are then bent round as shown at Figs. 2 and 2ᴮ, so as to encircle the two tubes, the ends being passed into the space between the pockets 11 11, so that, suitable slots having previously been punched in the straps and pockets, it will be seen that on driving in the key 12 the straps will be drawn tightly round the tubes, and these will be thereby also drawn tight against the curved faces of the pockets 11 11, thus effecting a firm grip of the tubes by the binder, while the flanges or wings 10ᵇ serve for attachment to a lateral structural part.

Fig. 3 shows an elevation, and Fig. 3ᴬ a section on line X X, of a construction in which the binder is made to grip the tubes by means of a bolt situated on one side. The middle part 13 is for this purpose formed with four pockets 13ᵈ, adapted to fit against both sides of each tube. The middle part 13 is also formed with semicircular upper and lower edges to fit the tubes, and it has flanges 13ᵇ for lateral attachment. The two end parts 13ᶜ of the plate are bent respectively round the upper and lower tubes and the straight parts have perforated lugs 13ᵈ 13ᵈ welded thereon, through which passes the screw-bolt 14, so that on screwing this up the two ends will be drawn tightly round the two tubes and drawing these against the pocket 13ᵃ and the semicircular edges of 13 will cause the tubes to be effectually gripped by the binder.

Figs. 4, 4ᴬ, and 4ᴮ show a modification of the construction shown at Figs. 2 to 2ᴰ—that is to say, the binder is formed with a middle portion 17, connecting two straps 17ᵃ, two flanges 17ᵇ, and two pockets 18, the straps being tightened round the tubes by a key 19, but in this case the parts are so arranged that in tightening them up by means of the key, only the inner end of each strap 17ᵃ is acted upon thereby, so that the middle part can be fixed by the flanges 17ᵇ and bolts 20 to a lateral structural part before the inner ends are tightened up. For this purpose the ends of the straps are bent up into a hook shape 17ᶜ and the key 19 is driven in between these as shown, so that by thus drawing each end inward the strap portions are drawn tight round the upper and lower tubes, and at the same time the tubes are drawn tight against the shoulders of the pockets 18. A circular tube 17ᵈ is formed in the part 17 for the passage of the key 19.

Figs. 5 and 5ᴬ show a construction in which the binder is formed of two separate parts, the one part consisting of a plate 26, on which is formed a hollow stiffening-rib 26ᵃ, which corresponds to the pockets of the previous constructions, while the other part 27 consists of a flat strap, the middle part of which fits into the hollow rib, while the ends are bent round the tubes. These ends have perforated lugs 27ᵃ formed on them, and through these lugs is passed a screw-bolt 28, which also passes through embossed holes or pockets 26ᵇ in the rib 26ᵃ and through a corresponding slotted hole in the strap 27. Thus on screwing up the nut 29 of the bolt the strap is drawn tightly round the tubes and these are gripped firmly between the strap and the abutment afforded by the hollow rib 26ᵃ.

In all the above-described constructions the straps passing round the tubes may be provided with embossed holes in the center line of the binder for attachment thereof to a structural part by a bolt or rivet, as indicated at Figs. 1 and 2, instead of effecting such attachment by lateral brackets or flanges.

It will be seen that in all the constructions of binders described with reference to Figs. 1, 2, 3, 4, 5, and 6 by the forming of pockets or hollow ribs on the middle part of the binder such middle part is so stiffened as to effectually resist any forcing toward each other of the tubes by a transverse-acting strain or load, while the parts of the binder encircling the tubes effectually prevent these from being forced apart.

Although the herein-described wings or flanges for lateral attachment of the binder to some other structural part are an important feature of the invention, yet it is obvious that in binders that are not intended for lateral attachment they may be dispensed with.

What we claim is—

1. A metal binder constructed of a rolled or drawn plate one part of which is formed with pockets or hollow projections, which pockets serve both to stiffen such part and to act as abutments for the tubes to be secured while two other parts of the plate are formed as straps to encircle the tubes, said straps being tightened up by suitable devices so as to grip the tubes firmly against the said abutments, substantially as described.

2. In a metal binder formed of a rolled or drawn plate, the combination of a part having pockets or hollow projections formed thereon, two other parts formed as straps adapted to encircle the tubes to be secured together, embossed holes in such straps in the axial line of the binder adapted for the reception of bolts or rivets for attachment of the binder to other structural parts, and means for securing and tightening the straps round the said tubes, substantially as described.

3. In a metal binder formed of a rolled or drawn plate, the combination of a part having pockets or hollow projections, and lateral wings or flanges for attachment to other structural parts, two other parts formed as straps adapted to encircle the tubes to be secured together, embossed holes in such straps in the axial line of the binder, and means for securing and tightening the straps round the said tubes, substantially as described.

4. In a metal binder formed of a rolled or drawn plate parts 1, 1, having wings 2, 2, and $2^a$, $2^a$, pockets 3, 3, forming stiffening ribs and abutments for the tubes to be secured, perforated pockets 5, 5, forming abutments for the tightening screw bolt, and parts $1^a$, $1^a$, adapted to encircle the tubes to be secured, said parts being made to grip the said tubes firmly against the abutments 3, 3, by means of a screw bolt 6 passing through the pockets 5, 5, and through a hole $1^b$ in the part $1^a$ substantially as described.

In testimony whereof we have signed our names to this specification, in the presence of two subscribing witnesses, this 27th day of March, A. D. 1895.

GEORGE EARL CHURCH.
GEORGE WATSON ETTENGER.

Witnesses:
WALTER J. SKERTEN,
THOMAS LAKE.